3,231,375
ELECTROSTATIC PRINTING
Louis J. Sciambi, Woodbury, N.J., and Vernon L. Marquart, Scottsdale, Ariz., assignors to Radio Corporation of America, a corporation of Delaware
No Drawing. Filed Mar. 23, 1962, Ser. No. 182,086
10 Claims. (Cl. 96—1)

This invention relates generally to the art of electrostatic printing, and more particularly to improved letter-press plates and to novel methods of preparing such plates. The improved letter-press plates and novel methods of the present invention are particularly useful in the graphic arts.

It has been proposed recently to substitute letter-press plates prepared by electrophotographic processes for the letter-press plates prepared with photoresists by conventional photographic processes in the printing industry. One typical electrophotographic process employs a zinc plate that is coated with a particulate photoconductor of zinc oxide dispersed in a thermoplastic resinous binder. In using such a plate in the graphic arts, a substantially uniform electrostatic charge is applied to the surface of the photoconductor, and the charged surface is exposed to a light image to create a latent image on the surface. The latent image is developed with an electroscopic thermoplastic toner that is fused into the photoconductive coating. By the use of a suitable toner, such as one containing aluminum octoate, the resinous binder can be hardened in the areas where the photoconductive layer is coated with the toner. Thus, the toned image can become an etch resist wherein the areas of the image that have not been toned can be removed with a suitable solvent, and the zinc plate can be etched to a desired depth to form a letter-press plate.

It has been observed that letter-press plates produced by the aforementioned typical prior art method do not always produce prints of a desired resolution. This is especially true when the letter-press plate is an etched plate of a half-tone image. The reason for this lack of resolution seems to be the undercutting of the toner dots of the half tone image by the etching solutions used to etch these plates. It has also been observed that the photoconductive coating of insulating material does not adhere to the metal plate tenaciously enough to prevent some separation of the photoconductive coating from the plate during the etching process.

It is an object of the present invention to provide improved etchable plates and novel methods of making them.

Another object of the present invention is to provide improved etchable plates that are substantially free from the aforementioned disadvantages of prior art etchable plates.

A further object of the present invention is to provide improved methods of preparing letter-press plates and other etched products.

Still a further object of the present invention is to provide improved methods of bonding a photoconductive coating to a metal plate by bonding film that does not impair the conductivity of the metal plate or the electrostatic charge to be applied to the photoconductive coating.

In accordance with the present invention, the foregoing objects and advantages are attained by an improved etchable plate comprising a metal base plate, such as a zinc plate, for example, having a very thin chemically bonded film thereon, such as, for example, a complex chromate or phosphate primer, and overcoated with a coating of photoconductive material, such as, for example, zinc oxide dispersed in a resinous binder. In a preferred embodiment of the invention the bonding film, preferably of a weight within a range of 5–100 mg./square ft., is the reaction product of the metal of the base plate and an acid solution comprising either chromic acid or phosphoric acid. The resinous binder is one from a class of organic resins that can be cured or hardened by the cross-linking of molecular chains therein, curing being accomplished either by heat alone or with the aid of a cross-linking catalyst, such as aluminum octoate. The photoconductive coating should preferably be no less than 0.0004 inch and no more than 0.0008 inch in thickness. A preferred embodiment of an etchable printing plate, in accordance with this invention, comprises one which has incorporated in its photoconductive coating a sensitizing dye or dyes, such as fluorescein. Such sensitizing dyes improve the spectral response of the photoconductive coating, sometimes by a factor of ten, for example.

Printing plates, in accordance with the present invention, may be prepared from zinc plates commonly used in the printing industry. Such zinc plates are available with an etch-resistant plastic on their back surfaces. An acid solution of either a chromium salt or a phosphate salt is applied to the front surface of the zinc plate, by either a dipping, a spraying, or a brushing technique, until a thin bonding film of either yellowish brown amorphous chromium complex or a greyish white micro-crystalline phosphate complex, respectively, is formed. Depending upon the concentration of these acid solutions, the bonding film may be formed within a period of time ranging up to four minutes. The bonding film thus formed does not impair the conductivity of the metal base plate or the electrostatic charge that is subsequently applied to the photoconductive coating. The chemical reaction of the acid solution and the metal plate can be halted by rinsing the plate in water, preferably distilled water. This treatment of the zinc plate produces a chemically clean, oxide-free metal surface for which the chromate or phosphate complex of the bonding film has a marked chemical affinity so that the barrier film becomes a substantially integral part of the base plate. The bonding film provides primarily a base to which the photoconductive coating can adhere tenaciously. The bonding film also functions to prevent the formation of metallic soaps or oxides from forming on the metal plate.

The bonding film may be dried with air and coated with a material which comprises preferably two to three parts by weight of a photoconductive zinc oxide and one part by weight of a resinous binder, such as, for example, a resinous polysiloxane, and sufficient solvent to dissolve the binder material and to provide a coating mixture having a viscosity appropriate for the method of application to be used. In a preferred embodiment, the coating mixture also includes a small amount of light sensitizing dye. The coating mixture is sprayed onto the bonding film, the spraying volume and time being regulated to provide a photoconductive coating of about .4 mil to .8 mil in thickness.

The letter-press printing plate can be prepared from the etchable plate by electrophotographic methods. For example, a substantially uniform electrostatic charge can be applied to the photoconductive coating by means of a corona discharge device. The uniformly charged photoconductive coating is exposed to a light image to produce a latent electrostatic image on the coating. The latent image is developed by an electroscopic developer powder dispersed in an insulating liquid to provide a visible image. The developer powder should comprise a cross-linking catalyst, such as aluminum octoate, to harden the material in the photoconductive layer when it comes in contact with it. Heat hastens the catalytic action. The unhardened areas of the photoconductive layer can be removed with a suitable solvent, and the exposed surfaces of the zinc plate can now be etched to a desired depth, whereby the plate is prepared for use as a letter-press plate.

Example I

An etchable plate suitable for use as a letter-press plate in the printing industry may be prepared as follows: A commercially available zinc plate of the type supplied to the photoengraving trade is used as a base plate. This zinc plate has one side coated with an acid and alkali-resistant material that is chemically inert in the etching solutions commonly used in the graphic arts. In accordance with this example, the uncoated surface of the zinc plate is first cleaned thoroughly. This is accomplished preferably by scrubbing the plate surface with pumice and then rinsing the plate in distilled water. The plate is dried with forced cool air and then treated with a solution of chromic acid or a solution of a salt having chromium in the hexavalent state dissolved in an acid. These solutions usually contain a surface active agent also, that is, a wetting agent, such as an alkyl sulphate. These solutions may be applied to the zinc plate by immersion, spraying, or brushing techniques.

A typical solution is:

Chromic acid ($CrO_3$) _____ grams__ 200
Sulphuric acid (sp. gr. 1.84) _____ cc__ 18
Water _____ cc__ 1000

The zinc of the plate is permitted to react with the applied solution for a period of time until a thin, uniform film of chromate complex having a yellowish brown color is formed. This film may have a weight of from 5 to 100 mg./square ft. A preferred weight of film is 15 mg./square ft. After rinsing, the plate is dried in air. A number of commercially available solutions may be used in place of the aforementioned solution to react with the zinc and to form the thin bonding film of a chromate complex. Such commercially known solutions are, for example, Alodine or Lithoform (American Chemical Products, Inc., Ambler, Pa.), or Iridite (Allied Research Products, Baltimore, Md.).

When dry, a photoconductive coating of insulating material is applied to the chromate complex film. This coating may be applied by a spraying technique. The photoconductive coating is preferably a solution of two or three parts of photoconductive zinc oxide such as, for example, Florence Green Seal 8 (New Jersey Zinc Sales Corporation), and one part of a resin binder, such as, for example, a resinous polysiloxane, Silicon SR–82 (General Electric Corp.), Dow-Corning 840 resin (Dow-Corning Corp., Midland, Mich.). The photoconductive coating may also include a dye sensitizer, such as, for example, fluorescein, and a binder solvent, such as, for example, toluene or xylene. The photoconductive coating is applied to the bonding film preferably by means of commercial spray coating equipment to produce a substantially uniform coating of from .4 mil to .8 mil thickness. The coated plate is then dried by evaporating the solvent from the coating while the plate is maintained in a horizontal position, coated side up.

Example II

Another method of preparing an etchable plate for use in the printing industry is as follows: In this example, the commercially available zinc plate is cleaned and then treated with a phosphate solution comprising a phosphate salt and a mineral acid or phosphoric acid and one or more accelerators which may be inorganic salts of zinc, manganese, and copper, for example. These solutions also contain a surface active agent, that is, a wetting agent, such as an alkyl phosphoric acid. Commercially available solutions that are also suitable for reaction with the metal plates are Granodine (Allied Research Products, of Baltimore, Md.), and Turco Products (Turco Products, Wilmington, Calif.). The phosphate solution is permitted to react with the zinc plate until a greyish white film of a micro-crystalline phosphate complex is produced on the zinc plate. When the phosphate film is dry, it is coated with a photoconductive coating of insulating material in the manner described in Example I.

When a metal plate is processed as described in Example I or II, an etchable plate is obtained for use in the graphic arts in accordance with the following procedure: Firstly, a substantially uniform electrostatic charge is produced on the surface of the photoconductive coating. The charging may be accomplished by passing a corona generating device, well known in the electrostatic printing art, adjacent to the photoconductive coating. Secondly, the uniformly charged coating is exposed to a light image by either contact or projection techniques, well known in the photographic arts. This step produces a latent electrostatic image on the photoconductive coating. Thirdly, the electrostatic image is developed by the electrostatic attraction thereto of a colored developer material which contains a cross-linking catalyst for the binder resin of the photoconductive coating. This catalyst may be a dispersion of aluminum octoate powder in an insulating liquid. Fourthly, the developed image is heated to cause the catalytic material to cross-link the resin binder, whereby to harden it and to render it insoluble. The heat is maintained between 300 and 450° F. until the binder is cured, a period of from one to fifteen minutes. Fifthly, the photoconductive coating that has not been affected by the developer is dissolved with a solvent, such as a mixture of four parts kerosene and one part toluene. Sixthly, the zinc plate is now descummed and etched, in accordance with standard photoengraving practices, to form a letter-press plate.

In preparing letter-press plates by the aforementioned methods, it has been found that the bonding film and the photoconductive coating should be within a range of thicknesses for satisfactory results. If, for example, the thickness of the bonding film were less than 5 mg./square ft., poor bonding would exist between the photoconductive coating and the zinc plate. On the other hand, if the thickness of the bonding film were greater than 100 mg./square ft., the step of descumming the bonding film in the non-image areas, preparatory to etching, would be very difficult. Optimum results are presently obtained when the thickness of the bonding film is in the neighborhood of 15 mg./square ft.

The optimum thickness of the photoconductive coating is in the middle of the permissible range of thicknesses from 0.4 mil–0.8 mil. If the photoconductive coating thickness were less than 0.4 mil, the developed image would be deteriorated during the etching process. If, on the other hand, the photoconductive coating were greater than 0.8 mil, it would be difficult to wash away the photoconductive coating in the non-image areas, prior to the descumming process.

What is claimed is:

1. An etchable plate for use in an electrostatic printing process, said plate comprising
   (a) a metal base plate,
   (b) a bonding film chemically bonded to one surface of said base plate,
   (c) said film comprising a material selected from the group consisting of amorphous complex metal chromates and micro-crystalline complex metal phosphates,
   (d) a coating of photoconductive insulating material adhered to said film, and
   (e) said coating comprising a particulate photoconductor dispersed in a resinous binder capable of being hardened by cross-linking of molecular chains therein.

2. A plate for use in an electrostatic printing process, said plate comprising
   (a) a metal base plate,
   (b) a bonding film chemically bonded to one surface of said base plate,
   (c) said film comprising a reaction product of the metal of said plate and a solution selected from the group consisting of a chromic acid solution, (d) a metal salt dissolved in phosphoric acid, soluble metal chromates having chromium in the hexavalent state dissolved in an acid, and (e) a metal phosphate salt dissolved in an acid, and a coating of photoconductive insulating material adhered to said film, (f) said coating comprising a particulate photoconductor dispersed in an insulating resinous polysiloxane binder.

3. An etchable printing plate comprising
(a) a metal base plate coated on one side with an etch-resistant material,
(b) a bonding film chemically bonded to the other side of said base plate and having a weight within the range of 5–100 mg./sq. ft., said film comprising a material selected from the group consisting of amorphous complex metal chromates and micro-crystalline complex metal phosphates, and
(c) a photoconductive coating of insulating material adhered to said film,
(d) said coating comprising a particulate photoconductive zinc oxide dispersed in a resinous polysiloxane binder.

4. An etchable printing plate comprising
(a) a metal base plate coated on one side with an etch-resistant material,
(b) a bonding film chemically bonded to the other surface of said base plate,
(c) said film including at least a major proportion of a material selected from the group consisting of amorphous complex metal chromates and microcrystalline complex metal phosphates, and
(d) a layer of photoconductive insulating material of substantially uniform thickness adhering to said film,
(e) said thickness being between 0.0004 and 0.0008 inch, said layer comprising about 2½ parts by weight of photoconductive zinc oxide dispersed in 1 part by weight of a resinous binder capable of being hardened by cross-linking of molecular chains therein.

5. An etchable printing plate comprising
(a) a metal base plate coated on one side with an etch-resistant material,
(b) a film chemically bonded to the other surface of said base,
(c) said film being the reaction product of a solution and the metal of said surface,
(d) said solution comprising an inorganic salt dissolved in phosphoric acid, and
(e) adhering to said film a layer of photoconductive insulating material of substantially uniform thickness,
(f) said thickness being between 0.0004 and 0.0008 inch,
(g) said layer comprising from 2 to 3 parts by weight of photoconductive zinc oxide dispersed in 1 part by weight of a resinous binder adapted to be hardened by cross-linking of molecular chains therein.

6. In a method of preparing a letter-press plate from a substantially zinc base plate comprising the steps of:
(a) cleaning a surface of said plate,
(b) applying a solution of chromic acid to said cleaned surface to form a yellowish brown film thereon;
(c) rinsing said film on said plate with water to stop the reaction of said solution with the metal of said surface,
(d) drying said surface of said film, and
(e) applying a layer of a solution of photoconductive material in a resinous binder capable of being hardened by cross-linking of molecular chains therein, on said film to a uniform thickness of between 0.0004 and 0.0008 inch.

7. In a method of preparing a letter-press plate from a metal base plate comprising the steps of:
(a) cleaning a surface of said plate,
(b) applying to said surface a solution of salt having chromium in the hexavalent state dissolved in an acid to form a film on said surface of an amorphous chromium chromate complex,
(c) rinsing said plate with water to stop the reaction of said solution with the metal on said surface,
(d) drying said surface with air, and
(e) applying a thin layer of a solution of photoconductive material in a resinous binder capable of being hardened by cross-linking of molecular chains therein, on said film to a uniform thickness.

8. A method of preparing an etchable plate from a metal base plate comprising the steps of:
(a) cleaning a surface of said base plate,
(b) applying to the cleaned surface a solution of a phosphate salt to form on said surface a thin film of a micro-crystalline phosphate complex,
(c) rinsing said surface with water to stop the reaction on said surface,
(d) drying said surface, and
(e) applying a relatively thin layer of photoconductive material dispersed in a resinous binder capable of being hardened by cross-linking of molecular chains therein, on said film.

9. A method of preparing an etchable plate from a metal base plate comprising the steps of:
(a) cleaning a surface of said base plate,
(b) applying to the cleaned surface a solution of an inorganic salt dissolved in phosphoric acid to form a thin greyish white film of microcrystalline phosphate complex on said surface,
(c) rinsing said surface with water to stop the reaction on said surface,
(d) drying said surface with air, and
(e) applying a layer of photoconductive material dispersed in a resinous binder capable of being hardened by cross-linking of molecular chains therein, on said film to a thickness between 0.0004 and 0.0008 inch.

10. A method of preparing an etchable plate from a zinc plate comprising the steps of:
(a) cleaning a surface of said zinc plate,
(b) applying to the cleaned surface a solution of an inorganic salt dissolved in phosphoric acid to form a thin film of micro-crystalline phosphate complex on said surface,
(c) rinsing said surface with water to stop the reaction on said surface,
(d) drying said surface with air, and
(e) applying a coating of photoconductive material dispersed in a resinous binder capable of being hardened by cross-linking of molecular chains therein, on said film to a thickness between 0.0004 and 0.0008 inch.

References Cited by the Examiner

UNITED STATES PATENTS 2,663,636 12/1953 Middleton.
2,901,348 8/1959 Dessauer et al.

FOREIGN PATENTS 203,907 11/1956 Australia.
210,374 12/1957 Australia.

OTHER REFERENCES

Hartsuch, Chemistry of Lithography, Lithographic Technical Foundation, N.Y., 1952, pages 92–117.

NORMAN G. TORCHIN, *Primary Examiner.*